United States Patent
Stangl

(10) Patent No.: US 12,110,109 B2
(45) Date of Patent: Oct. 8, 2024

(54) DEVICE FOR ACCOMMODATING AND FOR RELEASING A PAYLOAD ON AN AERIAL VEHICLE

(71) Applicant: Airbus Defence and Space GmbH, Taufkirchen (DE)

(72) Inventor: Wolfgang Stangl, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 62 days.

(21) Appl. No.: 17/949,465

(22) Filed: Sep. 21, 2022

(65) Prior Publication Data
US 2023/0089584 A1    Mar. 23, 2023

(30) Foreign Application Priority Data
Sep. 22, 2021  (DE) ..................... 10 2021 124 570.2

(51) Int. Cl.
*B64D 1/06*    (2006.01)
(52) U.S. Cl.
CPC ...................... *B64D 1/06* (2013.01)
(58) Field of Classification Search
CPC ... B64D 1/04; B64D 1/02; B64D 1/00; B64D 1/12; B64D 1/06; B64D 7/08
See application file for complete search history.

(56) References Cited

U.S. PATENT DOCUMENTS

| | | | | |
|---|---|---|---|---|
| 2,409,210 A | * | 10/1946 | Jolly | B64D 1/04 89/1.51 |
| 3,008,376 A | * | 11/1961 | Brunow | F41F 3/06 89/1.51 |
| 3,216,322 A | * | 11/1965 | Wenger | B64D 1/04 294/82.26 |

(Continued)

FOREIGN PATENT DOCUMENTS

| | | |
|---|---|---|
| DE | 20 2020 100 183 U1 | 1/2020 |
| WO | WO 2011/081579 A1 | 7/2011 |

OTHER PUBLICATIONS

European Search Report for Application No. 22192606 dated Jan. 16, 2023.

(Continued)

*Primary Examiner* — Joshua J Michener
*Assistant Examiner* — Cindi M Curry
(74) *Attorney, Agent, or Firm* — KDW Firm PLLC

(57) ABSTRACT

A device for accommodating and for releasing a payload on an aerial vehicle having a mounting frame for accommodating the payload, a linear mover for positioning in a cavity of the aerial vehicle, the mover having a base and at least one holding element, and a release device on the mounting frame. The mounting frame has a largely planar opening area surrounded by an opening edge, wherein the mover is coupled with the mounting frame on a side of the mounting frame facing away from the opening area by the at least one holding element. The mover can move the mounting frame (Continued)

linearly and vertically to the opening area at a variable distance from the base, and the release device can hold the payload in the mounting frame and release it selectively from the mounting frame, where necessary, via the opening edge and in a direction away from the base.

15 Claims, 4 Drawing Sheets

(56) References Cited

U.S. PATENT DOCUMENTS

| | | | | |
|---|---|---|---|---|
| 3,273,459 | A * | 9/1966 | Lardin | B64D 1/06 294/82.26 |
| 4,520,975 | A | 6/1985 | Blackhurst | |
| 4,681,013 | A | 7/1987 | Farley et al. | |
| 4,697,764 | A * | 10/1987 | Hardy | B64D 1/06 89/1.51 |
| 6,250,195 | B1 * | 6/2001 | Mendoza | B64D 7/08 89/1.51 |
| 10,793,275 | B2 * | 10/2020 | Chavez | F41F 3/065 |
| 11,117,667 | B1 * | 9/2021 | McGann | B64C 39/024 |
| 11,505,318 | B2 * | 11/2022 | Keller | B64D 1/06 |
| 11,794,930 | B1 * | 10/2023 | McGann | B64U 10/13 |
| 2003/0192992 | A1 | 10/2003 | Olsen et al. | |
| 2020/0025513 | A1 * | 1/2020 | Wright | F41F 3/06 |
| 2020/0164982 | A1 | 5/2020 | Keller et al. | |
| 2020/0200506 | A1 * | 6/2020 | Campbell | F41F 3/08 |
| 2023/0089584 | A1 * | 3/2023 | Stangl | B64D 7/08 244/137.4 |

OTHER PUBLICATIONS

German Search Report for Application No. 102021124570 dated Aug. 29, 2022.

* cited by examiner

DEVICE FOR ACCOMMODATING AND FOR RELEASING A PAYLOAD ON AN AERIAL VEHICLE

CROSS-REFERENCE TO RELATED APPLICATION

This application claims priority to German Patent Application No. DE 102021124570.2 filed Sep. 22, 2021, the entire disclosure of which is incorporated by reference herein.

TECHNICAL FIELD

The present description relates to a device for accommodating and for releasing a payload on an aerial vehicle, and to an aerial vehicle having a device of this kind.

BACKGROUND

In order to reduce the radar signature of an aerial vehicle, for example a fighter aircraft, payloads have to be arranged in closable, internal bays. Payloads of this kind may include weapons systems, for example. In order to optimize flight properties in the subsonic and supersonic range, it is advisable for the aerial vehicle to be constructed in the smallest and most compact way possible, in order to save weight and increase the thrust-to-weight ratio and at the same time reduce the fuselage cross section, which increases the slenderness ratio and reduces the wave impedance. The aerial vehicle in question should be capable of deploying the payload within the entire flying range from low subsonic to high supersonic speeds. However, an open bay causes an unsteady air flow at higher speeds, which can influence the process of releasing the payload, and also aero-acoustic loads which are induced in the structure of the aerial vehicle.

In order to improve the air flow, extendable wind deflectors are frequently arranged in front of the bay in the direction of flight, the wind deflectors serving to divert the air flow from the bay. Furthermore, it is known in the art for an oblique rear wall to be arranged at a rear end in the direction of flight, in order to delimit the bay, which rear wall influences the air flow within the bay, in order to reduce the aero-acoustic load. Means of this kind are provided in the F-22 Raptor and the J-20, for example. However, these features increase the total length of the bay concerned, wherein the height and length of the bay are roughly proportionate to the length and height of the payload in the bay. Furthermore, in addition to the payload itself there is a hinge mechanism for cover flaps of the bay and also a corresponding drive and an additional driver for the necessary width of the bay.

SUMMARY

The problem addressed may be regarded as that of proposing a device for accommodating and for releasing a payload on an aerial vehicle, which device requires a smaller installation space in a cavity than devices known in the art, yet causes an at least equally low aero-acoustic load when there is a flow through the cavity. In particular, the device is to dispense with deflectors and other surfaces which are customarily used to improve the aero-acoustic properties.

This problem is solved by the subject matter and disclosure herein.

A device for accommodating and for releasing a payload on an aerial vehicle is disclosed, which device has a mounting frame for accommodating the payload, a linear mover that can be positioned in a cavity of the aerial vehicle, the mover having a base and at least one holding element, and also a release device arranged on the mounting frame, wherein the mounting frame has a largely planar opening area which is surrounded by an opening edge, wherein the mover is coupled with the mounting frame on a side of the mounting frame facing away from the opening area by the at least one holding element, wherein the mover is designed to move the mounting frame linearly and vertically to the opening area at a variable distance from the base, and wherein the release device is designed to hold the payload in the mounting frame and to release it selectively from the mounting frame, where necessary, via the opening edge and in a direction facing away from the base.

The device can be deployed on an aerial vehicle and is used, in particular, to accommodate and releaser a payload on an underside of the aerial vehicle. For this purpose, the aerial vehicle may have a bay or a cavity which is predominantly closed during flight by flaps referred to later on and can be selectively opened to release the payload. The linear mover is then arranged in the cavity and has a base which must be arranged in the cavity in an immovable, i.e. in a structurally fixed, manner. The base may have one or multiple components, with which the mover can be connected to the aerial vehicle or to the structure thereof. The base is therefore used following installation as the reference point for the movement that can be performed by the mover.

The mounting frame is an element which is not provided in customary devices to accommodate and release a payload, and which must be arranged along with the payload in the cavity. The mounting frame in this case encloses or surrounds the payload at least in part. The mounting frame preferably has a thin profile, so that the payload projects beyond the mounting frame. The mounting frame may have a shape which forms a rectangle at its outer edges. Inner contours of the mounting frame are preferably adapted to the payload. Depending on the configuration of the payload, the inner contours of the mounting frame may therefore deviate from a purely rectangular shape.

The actual mounting of the payload is guaranteed by the release device which is mechanically coupled with the mounting frame and is detachably connected to the payload. By the release device, which is particularly able to move the payload at right angles to the opening area, the payload can be moved out of the mounting frame. The mounting frame is therefore movable relative to the cavity and can be moved as far as the opening area.

The device has the particular advantage that the mounting frame has a favorable influence on the aero-acoustic properties of the cavity, in order to move the payload in the cavity. During the flight, the mounting frame is moved along with the payload facing away from an opening in the cavity in the direction of the inside of the aerial vehicle, and the cavity is closed outwardly. The aerial vehicle therefore has a completely closed surface in this state. In order to release the payload, the mounting frame is therefore moved in the direction of the opening in the cavity, so that the payload is adjacent to the opening in the cavity and can project therefrom. The mounting frame preferably ends flush with the opening in the cavity in this state, so that gaps between the mounting frame and an opening contour of the cavity are closed. The entry of an air flow running to the cavity is thereby largely prevented. Extendable deflectors, oblique end faces or other aerodynamic means for improving the aero-acoustic properties are not therefore necessary. The installation space required for the device according to the disclosure herein, in particular parallel to the direction of flight, can thereby be substantially reduced compared with solutions known in the art.

The mounting frame may have a flat underside. This is particularly advisable in the case of aerial vehicle which have a flat underside, at least in sections, in which an opening of the cavity ends, from which the payload is to be delivered. The mounting frame then ends flush with the adjacent surface of the underside. The gap dimensions between the adjacent surface and the mounting frame can be minimized with suitable guidance of the mounting frame, in order to create a largely closed surface with the mounting frame. The aero-acoustic properties are therefore substantially improved.

In addition, the device may have at least one flap for the selective opening of the cavity which can be mounted in a swivelable manner on the aerial vehicle, wherein the at least one flap has at least one lever arm in each case, which is coupled with the mover, so that the at least one flap is opened or closed during movement of the mover. The at least one flap may be directly coupled with a structure of the aerial vehicle via the at least one lever arm, so that a predetermined movement can be carried out. The structure may comprise a payload housing forming the cavity, for example, on which the at least one flap is arranged in a swivelable and/or movement-guided manner. A possible embodiment for this purpose is explained in greater detail below. Coupling with the mover may take place by mounting the at least one flap by the at least one lever arm on the mounting frame. If the mounting frame is moved by the mover, the at least one flap follows the movement of the mounting frame and is therefore likewise moved by the mover.

The at least one flap may be forced by a spring force into an open position, wherein the at least one lever arm is mounted in a guide element, rests against the mounting frame due to the spring force and is displaced in the guide element by the spring force during movement of the mounting frame. If the mounting frame is moved to the opening of the cavity, the at least one flap can follow the movement of the mounting frame through the continuously adjacent spring force and thereby perform an opening movement. Equally, the at least one flap is closed when the mounting frame is moved in the direction of the inside of the aerial vehicle. A flexible coupling is produced by the spring force. Particularly when using elongate flaps, distortion of the at least one flap can be prevented during a dynamic flight movement of the aerial vehicle.

The at least one lever arm may have a guide body which is guided in a guide track as the guide element which can be attached in the aerial vehicle in a structurally fixed manner. The guide track may be arranged on a front end of a payload housing forming the cavity, for example, and configured as a curved recess or a curved projection. The guide body is configured in a manner corresponding thereto and may be guided in the guide track between a first position which corresponds to a closed at least one flap and a second position which corresponds to an open at least one flap. The guide body may slide along the guide track or be rolled along by rolling bodies.

The mover may have a spindle drive. This may comprise an electric motor or a hydraulic motor which is coupled with an elongate spindle, the spindle being rotated about its longitudinal axis. The spindle may be a threaded spindle or a recirculating ball spindle. By rotating in a first direction, the mounting frame is moved in the direction of the opening in the cavity. During rotation in a second direction contrary to the first direction, the mounting frame is however moved into the inside of the cavity. The spindle drive is extremely reliable, robust, easily adapted to the anticipated loads and easy to maintain.

The spindle drive may be arranged largely parallel to the opening area and connected at each of two ends opposite one another to a rocker lever that can be mounted in a structurally fixed manner, wherein the respective rocker lever can be coupled with the mounting frame via a connecting link mounted in a swivelling manner on both sides. Two sides of the mounting frame which lie opposite one another are therefore moved simultaneously by the spindle drive. The spindle drive may be arranged in a floating manner between the two rocker levers and perform an axial expansion or contraction. The rocker levers convert the change in length of the spindle drive parallel to the opening area into a movement with a component vertical to the opening area. The connecting links may be swivelable on both sides and realized as a pendulum support, for example. They lead to a purely linear movement of the mounting frame in a direction vertical to the opening area.

A further rocker lever which is arranged parallel to, and at a distance from, the other rocker lever and is mechanically coupled may be provided at each end of the spindle drive, wherein the rocker levers at each of two ends are arranged in a mirror-inverted manner to each other. The mounting frame is therefore coupled with the spindle drive by a total of four rocker levers, so that a uniform movement can be performed vertically to the opening area.

A connecting line of hinged joints of each rocker lever and of hinged joints of the associated connecting link may form a straight line when the mounting frame is in an extended position. The extended position is thereby clearly defined mechanically to begin with. When a straight line is adopted, a force effect directed from outside on the mounting frame, independently of the spindle drive, can also be conducted completely into the structure of the aerial vehicle.

At least one of each pair of rocker levers and the associated connecting link may have an end stop which is designed so that the associated rocker lever and the associated connecting link form the straight line in the extended position. The straight line may therefore be achieved automatically when the mover is completely extended. The end stop is furthermore advantageous, in order for the extended position to be adopted and retained very precisely. It is conceivable for the mover to stop automatically when it reaches an end stop of this kind on account of a substantial load increase being detected.

The device may furthermore have a linear guide for conducting the mounting frame in a direction at right angles to the opening area. The linear guide allows the mounting frame to be guided in a direction parallel to an opening in the cavity. Very precise placement of the mounting frame in the opening can thereby be achieved, so that gap dimensions between the mounting frame and the opening can be reduced to a minimum.

The device may also have two side walls arranged parallel to one another and spaced apart from one another and two front walls opposite one another and connecting the side walls, wherein the front walls each have at least one guide track. The guide track may realize the previously represented guide element in which the at least one lever arm is guided. Through the structurally fixed arrangement of the guide track, the relative movement of the at least one flap on the aerial vehicle can be precisely defined. If multiple flaps should be used, each of the flaps may be assigned a pair of guide tracks lying opposite one another. In this case, the flaps lying opposite one another are parallel to one other and congruent, meaning that the flap concerned can be opened uniformly and in and at least largely distortion-free manner.

It is preferable for the mounting frame to enclose a gap of less than 1 cm with the side walls and the front walls. The aero-acoustic properties can thereby be affected very favorably; the gap size is particularly small. This can be achieved, in particular, through a precise guidance and/or uniform movement of the mounting frame.

The disclosure herein further relates to an aerial vehicle, having a structure with a cavity formed therein and a device arranged in the cavity according to the preceding description.

The cavity may have an opening which is arranged on the underside of the aerial vehicle, so that the payload can be released from the underside of the aerial vehicle.

BRIEF DESCRIPTION OF THE DRAWINGS

The example embodiments are looked at in greater detail below with the help of the attached drawings. The representations are schematic and not true-to-scale. The same reference signs relate to the same or similar elements. In the drawing.

DETAILED DESCRIPTION

Figure 1:
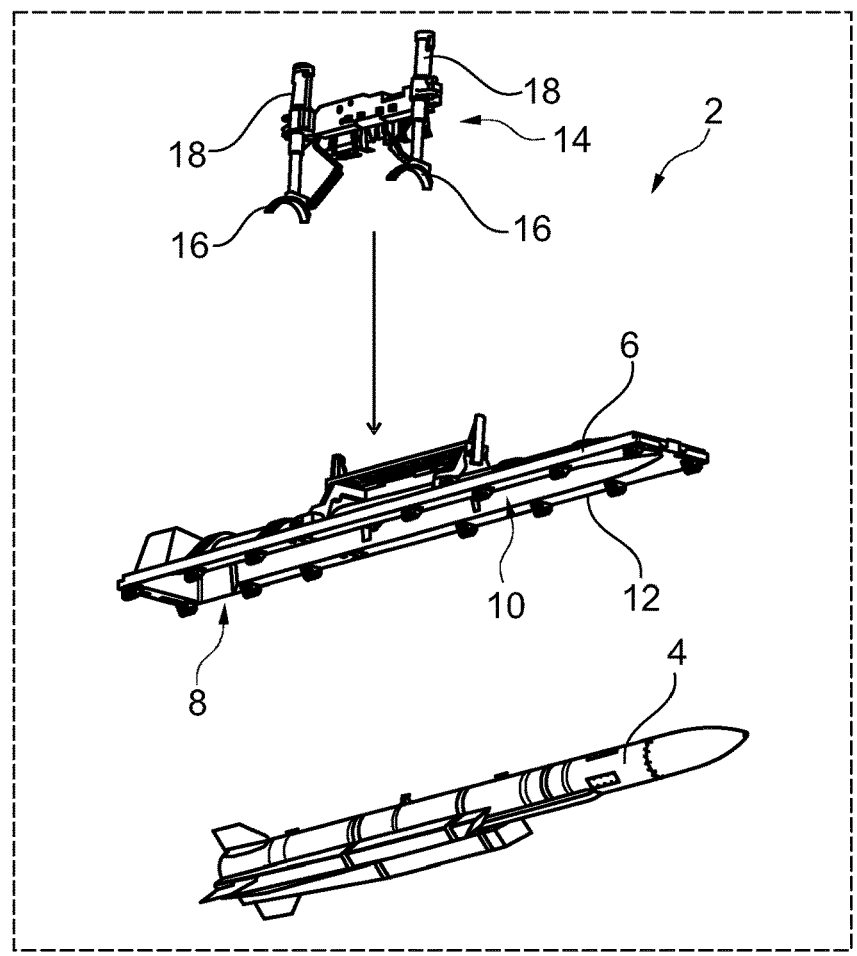
FIGS. 1 through 3, 5, 8a and 8b show a schematic representation of a device for accommodating and for releasing a payload according to one example embodiment in different views.

FIG. 1 shows a device 2 for accommodating and deploying a payload 4 on an aerial vehicle. The device 2 comprises a mounting frame 6 for accommodating the payload 4, which has a flat underside 8 in this example embodiment, in which a planar opening area 10 lies. The opening area 10 is surrounded by an opening edge 12 which forms a largely rectangular area. The mounting frame 6 is provided to enclose the payload 4 at least partially and to move it, where necessary, in a vertical direction, i.e. vertically to the area formed by the opening edge 12. The payload 4 projects partially from the mounting frame 6 beyond the opening area 10. The opening area 10 is arranged on the underside 8, so that the payload 4 is released downwardly.

A release device 14 is provided for holding and moving the payload 4, the release device comprising two curved pieces 16 which are linearly movable and which are each arranged on a linear drive 18. The linear drives 18 are arranged on the mounting frame 6 and oriented in such a manner that the curved pieces 16 can be moved transversely to the opening area 10, i.e. downwards and upwards. They hold the payload 4 and can move it from the mounting frame 6, where necessary, and release it. The linear drives 18 may comprise spindle drives, hydraulic actuators or other means which can perform a purely linear movement.

The particular advantage of this example embodiment of the device 2 lies in the fact that a cavity can be configured free from wind deflectors or similar flow-mechanical means in an aerial vehicle in which the device 2 is to be arranged, so that optimal aero-acoustic properties are exhibited wherever possible when the payload 4 is released. The installation position is depicted in the figures shown below.

Figure 2:
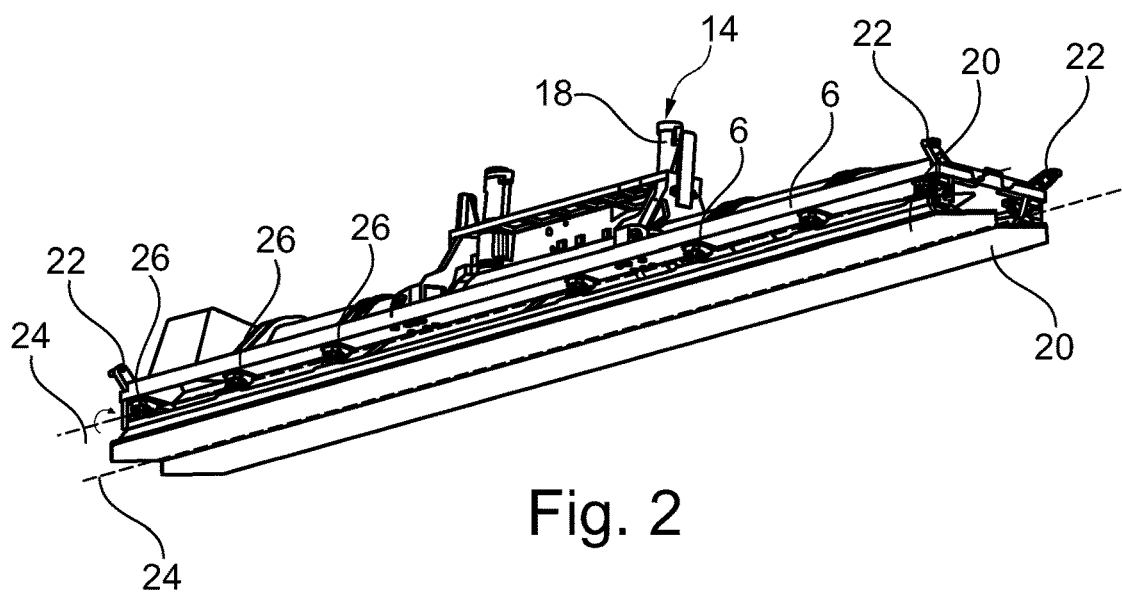

FIG. 2 shows the release device 14 which is arranged on the mounting frame 6. In this case, flaps 20 are furthermore depicted which each have lever arms 22 which extend in the direction of the mounting frame 6 and beyond and are each laterally bent slightly outwards. A bend angle may be roughly 40° and may determine the opening angle of the flaps 20 according to the details specified below. The flaps 20 are mounted on the mounting frame 6 so as to be swivelable about an axis 24. For this purpose, a series of hinges 26 is provided which are arranged on the opening edge 12 of the mounting frame 6.

Figure 3:
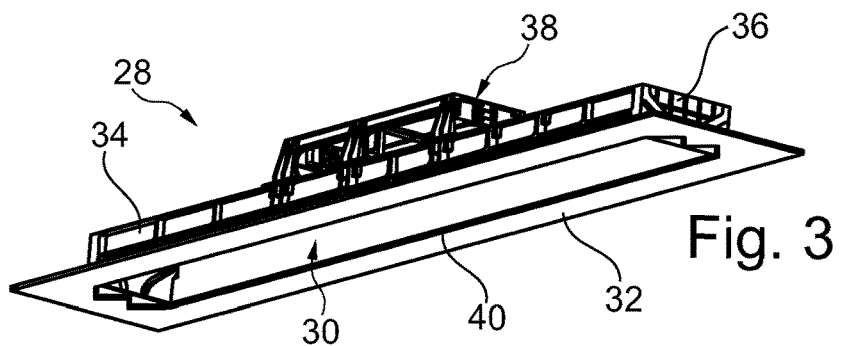

FIG. 3 shows a payload housing 28, in which a cavity 30 is provided which opens out into a fuselage skin 32. The payload housing 28 has two side walls 34 arranged parallel to one another and spaced apart from one another, wherein front walls 36 run between two ends of the side walls 34 and thereby complete the payload housing 28. The arrangement shown in FIG. 2 may be integrated into the cavity 30, so that the flaps 20 end flush with the fuselage skin 32 and the release device 14 is fastened to an upper installation portion 38. The fuselage skin 32 and also the payload housing 28 are part of an aerial vehicle which carries the payload and releases it from the cavity 30 where necessary.

According to the disclosure herein, it is provided that the mounting frame 6 is movable along with the release device 14 within the cavity at right angles to the fuselage skin 32 or to an opening 40 formed therein. The device may furthermore have a linear guide 3 for conducting the mounting frame 6 in a direction at right angles to the opening area. (See, e.g., FIG. 8B) The linear guide 3 allows the mounting frame 6 to be guided in a direction parallel to an opening in the cavity. If the mounting frame 6 is moved in the direction of the opening 40, the payload 4 projects partially beyond the fuselage skin 32 and can finally be released by the release device 14. In this case, the mounting frame 6 closes any gaps 7 between the payload 4 and the opening 40 almost completely. In this way, the aero-acoustic properties are favorably influenced.

Figure 4:
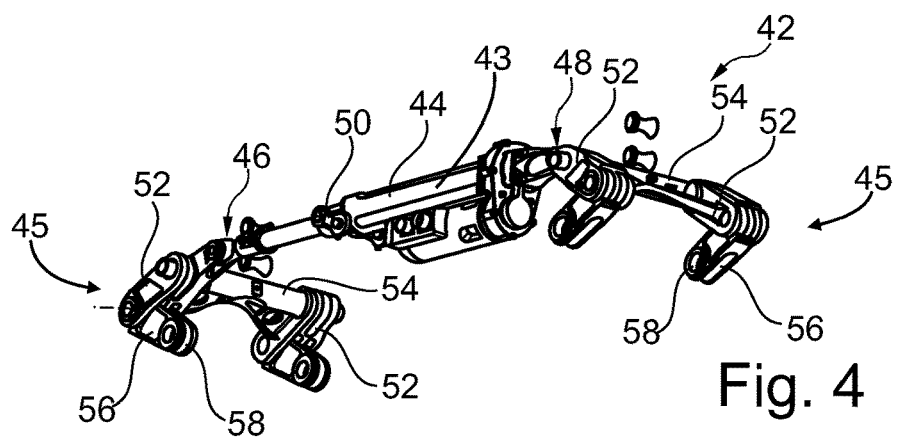
FIGS. 4, 6 7a, 7b and 8c show schematic representations of different details of the example embodiment.

FIG. 4 shows mover 42 for moving the mounting frame 6. The mover 42 has a base 43, at least one holding element 45, and a spindle drive 44 which is arranged parallel to the opening area 10 and preferably oriented parallel to the longitudinal axis of the aerial vehicle. The spindle drive 44 has a first end 46 and a second end 48. Operating the spindle drive 44 causes the two ends 46 and 48 to move away from, or towards, one another. The spindle drive 44 also has a guide lever 50 which is mounted in a swivelable manner transversely to the movement direction. In this way, the spindle drive 44 is held on the payload housing 28 in a narrowly restricted range of motion.

Two rocker levers 52 are arranged at each of the two ends 46 and 48, the rocker levers being mounted in the payload housing 28 in a swivelable manner. For this purpose, they are arranged on an axle 54, for example, which runs transversely to the movement direction of the spindle drive 44. The axle 54 is at the same time used for coupling the two rocker levers 52.

The rocker levers 52 are each connected to the mounting frame 6 by a pivotably fastened connecting link 56. The connecting links 56 more or less act as a pendulum support in each case. When the spindle drive 44 is extended, the two ends 46 move apart from one another and the rocker levers 52 are moved out of their oblique position in FIG. 4 in a substantially vertical orientation. In this way, outer bearing points 58 of the swivelable connecting links 56 move away from the spindle drive 44 downwards. The mounting frame 6 is thereby moved downwards. The spindle drive 44 can be displaced by the guide lever 50 in a compensating manner parallel to its linear movement, so that the rocker levers 52 are moved uniformly at both ends 46 and 48.

Figure 5:
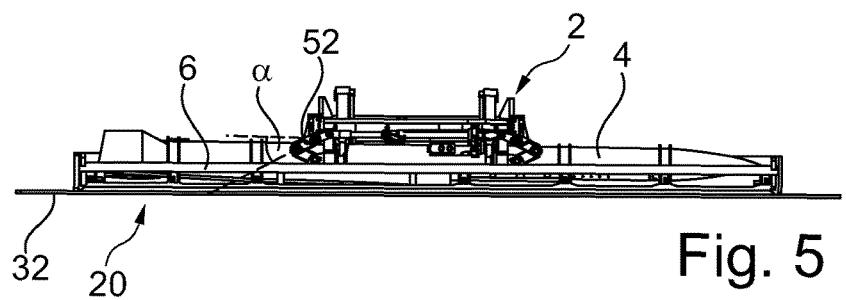
Figure 6:
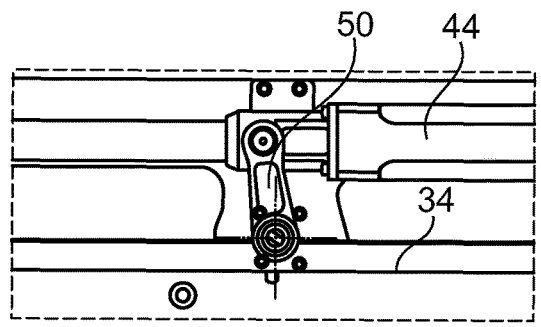

FIG. 5 shows the device 2 with the mounting frame 6 in a neutral position, i.e. a position spaced inwardly as far away from the fuselage skin 32 as possible. The rocker levers 52 are at an angle α of approximately 30° to the spindle drive 44. The flaps 20 are closed and the payload 4 is located completely within the aerial vehicle or the cavity 30. FIG. 6 shows the guide lever 50 with the spindle drive 44 completely extended.

Figure 7A:
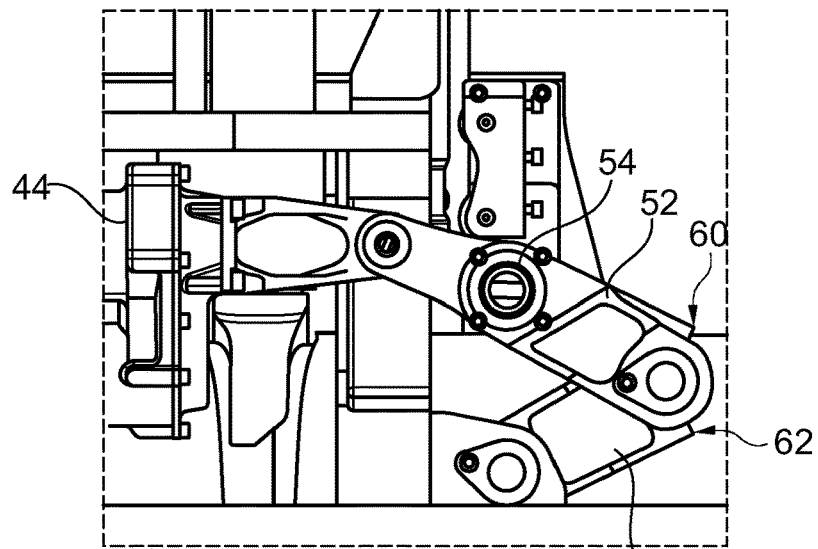
Figure 7B:
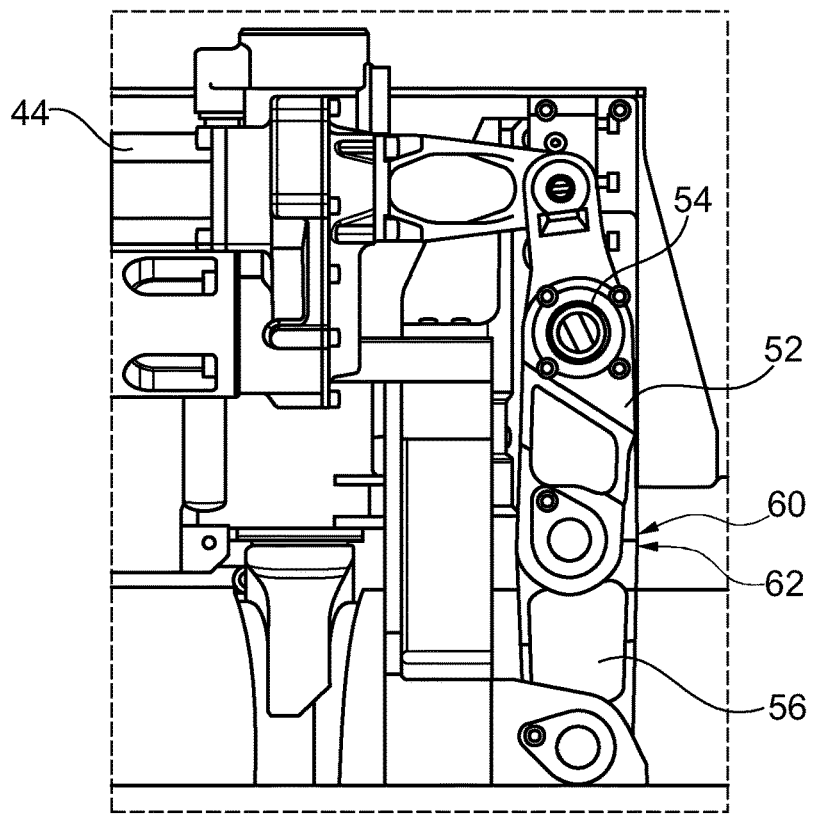

FIGS. 7a and 7b show the rocker levers 52 in the retracted position (neutral position) (FIG. 7a) or with the mounting frame 6 completely lowered (FIG. 7b). The individual rocker levers 52 have a first end stop 60 on a side facing away from the spindle drive 44. The connecting links 56 face a second end stop 62 on the corresponding side. If the rocker lever 52 is located in a vertical position and is therefore at an angle of roughly 90° to the spindle drive 44, the first end stop 60 and the second end stop 62 come into flush planar contact. Further swivelling of the rocker levers 52 is not possible in this case and the completely extended position of the mounting frame 6 is guaranteed. In this case, the rocker levers 52 and the associated connecting links 56 each form a straight line.

Figure 8A:
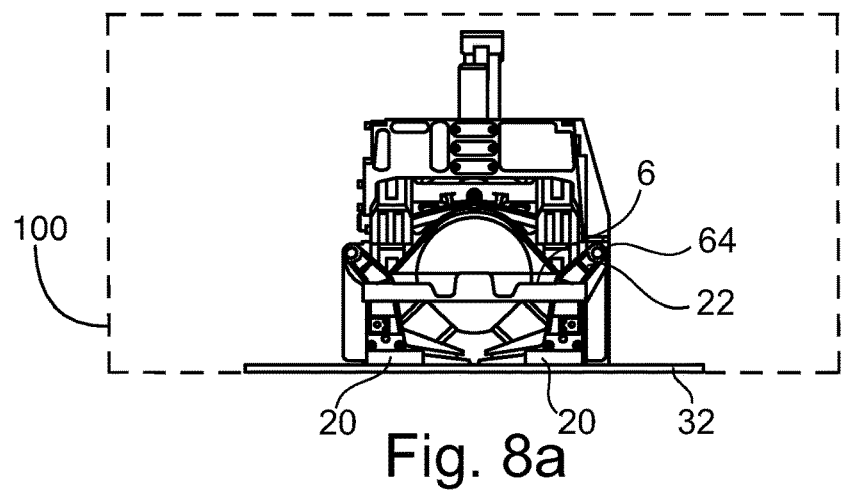
Figure 8B:
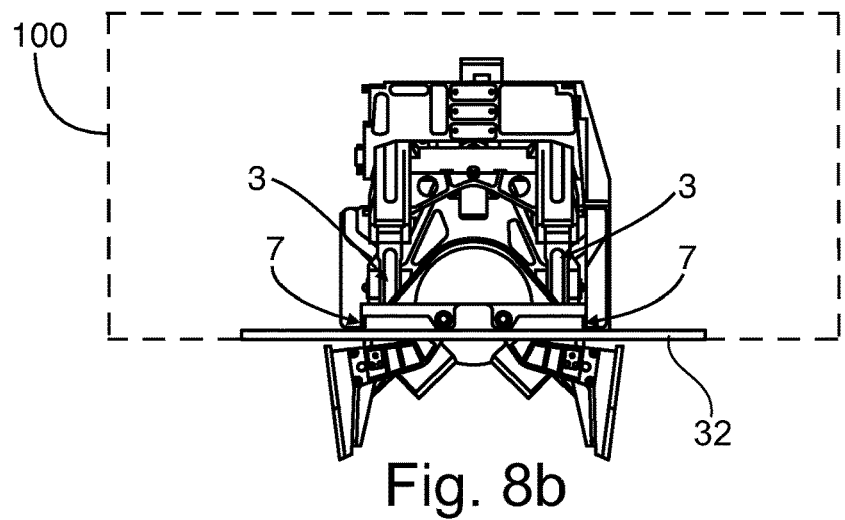

The process involved in opening the flaps 20 with respect to the aerial vehicle, schematically represented as 100, is depicted in greater detail in FIGS. 8a and 8b. FIG. 8a shows the neutral position in which the mounting frame 6 is spaced as far away as possible from the fuselage skin 32 in the direction of the inside of the cavity 30. The flaps 20 are closed in this case. The lever arms 22 project substantially vertically from the flaps 20 or the fuselage skin 32 in the direction of the mounting frame 6, penetrate these and are bent outwardly in the lateral direction. The ends of the lever arms 22 each have a guide body 64 which is guided in a guide track 66 of a side wall 36 of the payload housing 28 (see FIG. 8c). If the mounting frame 6 is moved into the release position in FIG. 8b, the hinges 26 of the flaps 20 are moved along outwardly. The lever arms 22 follow the movement and the guide bodies 64 are moved in the associated guide track 66, so that they move laterally to open, in addition to the downwardly oriented movement. The guide tracks 66 of two adjacent flaps 20 may have a substantially curved V-shape.

Figure 8C:
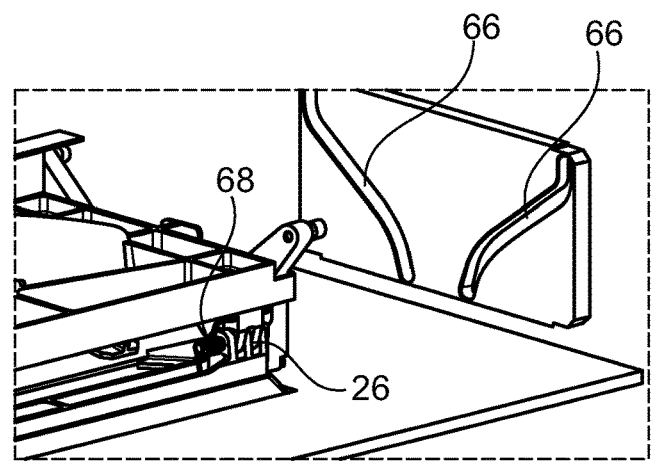

In addition, it can be seen in FIG. 8c that the flaps 20 are spring-mounted by a torsion spring 68 on the hinges 26 concerned. This results in the flaps 20 constantly being forced into a closed position.

In addition, it should be pointed out that "comprising" or "having" does not preclude other elements or steps and "a" or "an" does not preclude a plurality. In addition, it should be pointed out the features or steps which have been described with reference to one of the above example embodiments can also be used in combination with other features or steps of different example embodiments described above. Reference signs in the claims should not be regarded as limiting.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 2 device
3 linear guide
4 payload
6 mounting frame
7 gap
8 underside
10 opening area
12 opening edge
14 release device
16 curved piece
18 linear drive
20 flap
22 lever arm
24 axle
26 hinge
28 payload housing
30 cavity
32 fuselage skin
34 side wall
36 front wall
38 upper installation portion
40 opening (in the cavity)
42 mover
43 base
44 spindle drive
45 holding element
46 first end
48 second end
50 guide lever
52 rocker lever
54 axle
56 connecting link
58 outer bearing point
60 first end stop
62 second end stop
64 guide body
66 guide track
68 torsion spring
100 aerial vehicle

The invention claimed is:

1. A device for accommodating and for releasing a payload on an aerial vehicle, comprising:
a mounting frame for accommodating the payload;
a linear mover that can be positioned in a cavity of an aerial vehicle, the cavity having an opening and the mover having a base and at least one holding element;
a release device arranged on the mounting frame;
the mounting frame comprising a planar opening area which is surrounded by an opening edge;
wherein the mover is coupled with the mounting frame on a side of the mounting frame facing away from the opening area by the at least one holding element;
wherein the mover is configured to move the mounting frame linearly and vertically in the direction of the opening in the cavity at a variable distance from the base;
wherein the release device is configured to hold the payload in the mounting frame such that the mounting frame encloses or surrounds the payload at least in part when the mounting frame is in a neutral position or in a release position;

wherein the linear mover is configured to move the mounting frame between the neutral position and the release position; and wherein the release device is configured to move the payload selectively from the mounting frame, where necessary and when the mounting frame is in the release position, via the opening edge and in a direction facing away from the base and to release the payload.

2. The device according to claim 1, wherein the mounting frame has a flat underside.

3. The device according to claim 1,
further having at least one flap for the selective opening of the cavity which can be mounted in a swivelable manner on the aerial vehicle,
wherein the at least one flap has at least one lever arm in each case, which is coupled with the mover, so that the at least one flap is opened or closed during movement of the mover.

4. The device according to claim 3,
wherein the at least one flap is forced by a force of a torsion spring into a closed position, and
wherein the at least one lever arm is mounted in a guide track, rests against the mounting frame due to the force of the torsion spring and is displaced in the guide track by the force of the torsion spring during movement of the mounting frame.

5. The device according to claim 4, wherein the at least one lever arm has a guide body which is guided in the guide track which can be attached in the aerial vehicle in a structurally fixed manner.

6. The device according to claim 1, wherein the mover has a spindle drive.

7. The device according to claim 6, wherein the spindle drive is arranged parallel to the opening area and connected at each of two ends opposite one another to respective first and second rocker levers that can be mounted in a structurally fixed manner, wherein the respective rocker lever is coupled with the mounting frame via a connecting link mounted in a swivelling manner on both sides.

8. The device according to claim 7,
wherein respective third and fourth rocker levers are arranged parallel to, and at a distance from, the first and second rocker levers, respectively, and are mechanically coupled at each end of the spindle drive, and
wherein the rocker levers at each of two ends are arranged in a mirror-inverted manner to each other.

9. The device according to claim 7, wherein each rocker lever and a corresponding associated connecting link forms a straight line when the mounting frame is in an extended position.

10. The device according to claim 9, wherein at least one of each of rocker lever and the associated connecting link comprises an end stop which is configured so that the associated rocker lever and the associated connecting link form the straight line in the extended position.

11. The device according to claim 1, comprising a linear guide for conducting the mounting frame in a direction at right angles to the opening area.

12. The device according to claim 5,
the device further comprising a payload housing, the payload housing comprising two side walls arranged parallel to one another and spaced apart from one another and two front walls opposite one another and connecting the side walls, and
wherein the front walls each comprise at least one guide track.

13. The device according to claim 12, wherein the mounting frame encloses a gap of less than 1 cm with the side walls and the front walls.

14. An aerial vehicle comprising a structure with a cavity formed therein and a device according to claim 1 in the cavity.

15. The aerial vehicle according to claim 14, wherein the cavity has an opening which is on an underside of the aerial vehicle so that the payload can be released from the underside of the aerial vehicle.

* * * * *